United States Patent [19]
Neuman

[11] Patent Number: 5,948,131
[45] Date of Patent: Sep. 7, 1999

[54] MULTILAYER ANTIREFLECTIVE COATING WITH A GRADED BASE LAYER

[75] Inventor: George A. Neuman, Pittsburgh, Pa.

[73] Assignee: PPG Industries Ohio, Inc., Cleveland, Ohio

[21] Appl. No.: 09/054,566

[22] Filed: Apr. 3, 1998

Related U.S. Application Data

[62] Division of application No. 08/364,148, Dec. 27, 1994, Pat. No. 5,811,191.

[51] Int. Cl.[6] .................................................... C03C 17/00
[52] U.S. Cl. ........................... 65/60.2; 65/60.5; 65/60.53; 65/60.8
[58] Field of Search .................................. 65/60.2, 60.5, 65/60.53, 60.8

[56] References Cited

U.S. PATENT DOCUMENTS 5,811,191   9/1998   Neuman ................................. 428/427

Primary Examiner—Timothy Speer
Attorney, Agent, or Firm—Donald C. Lepiane

[57] ABSTRACT

An antireflectance coating is disclosed comprising a first graded layer wherein the composition is varied throughout the thickness of the layer such that the refractive index of the graded layer varies from a low refractive index approximately matching the refractive index of the substrate at the interface of the graded layer and the substrate to a higher refractive index at the surface of the graded layer opposite the interface with the substrate, and a second substantially homogeneous layer of a composition selected to have a refractive index which is approximately the square root of the product of the higher refractive index of the graded layer and the refractive index of the incident medium at the surface of the second layer opposite the interface of the second layer with the graded layer, having an optical thickness of approximately at least one quarter of a selected design wavelength. The antireflectance properties of the coating of the present invention can be expanded to a broader range of reflected wavelengths by incorporating, between the graded layer and the second substantially homogeneous layer, an intermediate layer having a relatively high refractive index and an optical thickness of about half the design wavelength.

17 Claims, 6 Drawing Sheets

MULTILAYER ANTIREFLECTIVE COATING WITH A GRADED BASE LAYER

CROSS REFERENCE TO RELATED APPLICATIONS

This application is a divisional of U.S. patent application Ser. No. 08/364,148 filed Dec. 27, 1994, by George A. Neuman titled "Multilayer Antireflective Coating With A Graded Base Layer" now U.S. Pat. No. 5,811,191.

BACKGROUND OF THE INVENTION

1. Field of the Invention

The present invention relates generally to the art of antireflective coatings, and more particularly to the art of multilayer antireflective coatings on glass.

2. Relevant Art

A method for attenuating the refractive index difference between a metal oxide and a glass substrate is disclosed in U.S. Pat. No. 3,378,396 to Zaromb, wherein a glass substrate is coated by simultaneously directing separate sprays of a tin chloride solution and a silicon chloride solution onto a stationary heated glass substrate in an oxidizing atmosphere, e.g. air. The heat of the glass substrate thermally converts the metal chlorides to their metal oxides. The ratio of the sprays to each other are gradually varied to vary the ratio of the weight percent of the metal oxides in the coating. The resultant coating has a continuously changing composition throughout its thickness, e.g. near the glass-coating interface, the coating is predominantly silicon oxide, the surface of the coating furthest from the glass-coating interface is predominantly tin oxide, and between the surfaces the coating is made up of varying weight percent amounts of silicon oxide and tin oxide.

U.S. Pat. Nos. 4,206,252 and 4,440,882 teach the depositing of a second coating composed of fluorine-doped tin oxide on a gradient coating such as described above.

SUMMARY OF THE INVENTION

The present invention relates to a method of coating a substrate with a multilayer antireflective coating comprising a first layer having a continuously changing chemical composition, and a correspondingly continuously changing refractive index, as the distance from the glass-coating interface increases, and a relatively homogeneous second layer with a refractive index and thickness selected to provide antireflectance. The first layer, referred to herein as the graded layer, gradually changes in refractive index from an approximate match to the refractive index of the substrate at the substrate surface to a higher value at the surface of the graded layer away from the interface of the coating and substrate. The second layer, placed on top of the graded layer, is referred to herein as the antireflective layer. The approximate refractive index at the high value of the graded layer is chosen such that a composition is selected for the antireflective layer that has a refractive index which is approximately the square root of the refractive index of the incident medium times the refractive index of the graded layer at the higher value. The antireflective layer is applied at an optical thickness that is one quarter the design wavelength, i.e. the wavelength selected for optimum antireflectance. Thus, for example, at normal incidence, if the refractive index of the graded layer at the high value is 2.1 and the incident medium is air, with a refractive index of 1.0, then the refractive index of the antireflective layer would be approximately 1.45, with a physical thickness of approximately 900 Angstroms for a design wavelength of 5000 Angstroms. The performance of the antireflective coating of the present invention can be extended to a broader range of reflected wavelengths by placing between the graded layer and the antireflective layer an intermediate layer having a relatively high refractive index and an optical thickness of about half the design wavelength.

DESCRIPTION OF PREFERRED EMBODIMENTS

Figure 1A:
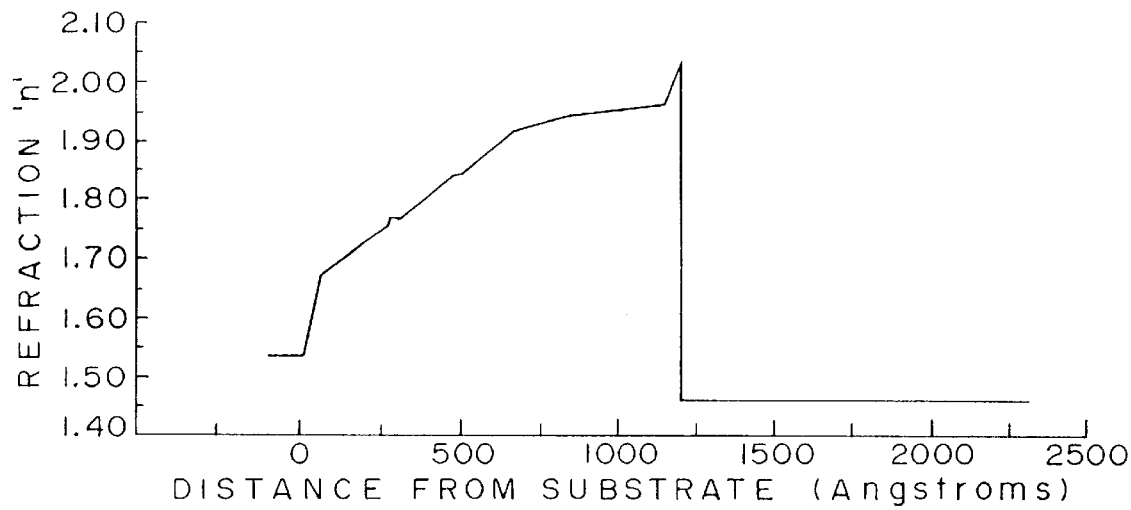
FIG 1a illustrates the refractive index profile for a coating having minimum luminous reflectance Y at a 65° viewing angle, showing the index of refraction as a function of distance from the substrate surface, through the graded layer and then the homogeneous layer, where the thickness of the graded layer is 1189 Angstroms and the $SiO_2$ layer is 1121 Angstroms.

The method for depositing the graded layer of the present invention preferably includes the steps of directing a vapor coating composition of metal-containing precursors, e.g. a silicon containing precursor and a tin-containing precursor, onto the surface of the glass ribbon; moving a first portion of the vapor along a first region of the ribbon surface in a first direction and a second portion of the vapor along a second region in a second opposite direction; and maintaining the first portion of the coating composition on the first region for a longer period of time than the second portion of the coating composition on the second region, to provide a coating on the glass ribbon having a varying composition of metal oxides as the distance from the coating-glass interface increases.

The invention preferably involves a transparent substrate, e.g. a glass substrate, having a coating thereon composed of mixed metal oxides, e.g. silicon oxide and tin oxide. The coating composition has a continuously changing ratio of silicon oxide to tin oxide as the distance from the glass-coating interface increases, e.g. substantially all silicon oxide at the glass coating interface and substantially all tin oxide at the opposite surface of the graded layer. Between the glass-coating interface and the opposite coating surface there are minimal, if any, strata of a fixed ratio of silicon oxide to metal oxide and there may be dispersed in the coating small amounts of phosphorus, boron, and/or aluminum when compounds containing those elements are used as accelerants to increase the coating deposition rate and control the coating morphology.

An article in accordance with the present invention includes a substrate, e.g. clear or colored glass, having a coating that exhibits minimum reflection of visible light by having a continually varying refractive index first layer and a second layer of specifically selected refractive index and thickness. An optional layer of half wave optical thickness may be deposited between the graded layer and the antireflective layer to provide improved antireflectance performance over a broader wavelength spectrum. The refractive index of this intermediate layer is relatively high, preferably in the range of 1.7 to 3.0, more preferably in the range of 1.8 to 2.8. A preferred composition for the intermediate layer is titanium dioxide, $TiO_2$. In the following examples, the substrate is a glass substrate. The first layer of the coating preferably comprises a mixture of silicon oxide and a metal oxide, such as tin oxide. The coating has a continuously changing composition as the distance from the glass-coating interface increases. Generally, near the glass-coating interface, the coating is predominantly silicon oxide, while at the opposite surface of the coating, i.e. the coating surface farthest from the glass-coating interface, the composition of the coating is predominantly tin oxide. Although the coating is discussed using a first layer of tin oxide and silicon oxide, the invention is not limited thereto and, as will be appreciated from the discussion below, any two or more compounds may be used in the practice of the invention to vary the refractive index of the graded layer.

The coating method, apparatus and reactants described in detail in U.S. Ser. No. 08/017,930 filed Feb. 16, 1993, by Athey et al. are especially effective for the chemical vapor deposition (CVD) of coatings from mixtures of silicon and metal containing precursors to form the graded layer in accordance with the present invention.

The first graded layer of the antireflective coating of the present invention is preferably made from a mixture of tin containing precursors and silicon containing precursors capable of being volatilized and converted to their corresponding oxides in the presence of oxygen at temperatures in the range of about 750° to about 1500° F. (about 400° C. to about 815° C.). As will be appreciated, the invention is not limited thereto and other metal containing precursors may be used with the coating apparatus and in the coating processes discussed above.

When the substrate, e.g. a glass substrate, is subjected to chemical vapor deposition of mixed oxides, for example, a mixture of silicon oxide and tin oxide, to obtain the graded layer thereon in accordance with the invention, the graded layer is characterized by having a continuously varying composition as the distance from the glass-coating interface increases, resulting in a substantial reduction in reflectance of the coated product. Assuming a coating composed of substantially silicon oxide and tin oxide, that portion of the coating adjacent to the glass-coating interface is composed largely of silicon oxide and as the distance from the glass-coating interface increases, each succeeding region of the continuously varying composition contains a silicon oxide to tin oxide ratio that varies as the distance from the glass-coating interface increases. More particularly, the percent of silicon oxide decreases as the percent of tin oxide increases, so that as the opposite surface of the graded layer is reached, the region is composed predominantly of tin oxide.

An advantage of the present invention is that the change in refractive index of the graded layer from an approximate match at the substrate surface to the higher value can be accomplished in a flexible manner. The simplest manner is a linear change with gradual transitions at the substrate and high index ends. However many additional profiles are suitable. The primary requirement of the graded layer of the present invention is that a gradual change in refractive index occurs between the substrate refractive index and the higher index value. Gradual is defined herein as such that the change in refractive index between one area of the graded coating to an adjacent area is not greater than about 0.1. The refractive index of the graded layer can decrease in value for portions of the coating as long as the change is gradual and the net change through the coating is an increase to the higher value. The refractive index change may be provided as a plurality of fixed index layers. The thickness of the graded layer must be at least about a quarter wave optical thickness, but the performance of the antireflective coating improves as this layer thickness increases. The maximum thickness is limited primarily by cost. Subtle variations of the antireflective coating thickness and the graded layer composition and thickness may be necessary to optimize the coating performance for a given application or to compensate for observation angle effects.

An additional advantage of the use of a graded layer in an antireflective coating is achieved when the coated article is intended for use at a high installation angle, such as an automotive windshield. When the installation angle is higher than the Brewster angle (defined as the inverse tangent of the refractive index) of the coating, the s (perpendicular) and p (parallel) polarization states cannot be simultaneously minimized. Since the graded layer provides a new surface having a higher refractive index, and therefore, a higher Brewster angle, antireflection performance may be optimized at higher installation angles. For example, a glass substrate with a refractive index of 1.52 has a Brewster angle of 56°. If the higher refractive index value of the graded layer is e.g. 2.0, the Brewster angle is 63°. If the higher refractive index value of the graded layer is e.g. 2.4, the Brewster angle is 67°. With a higher refractive index surface on which to deposit the low refractive index antireflectance layer, e.g. silica at about 1.45, the multilayer coating can be designed to better minimize both s and p polarization states to give better overall antireflectance performance at higher installation angles. Such improved antireflectance can also be achieved in accordance with the present invention with thinner coatings, and a simple and flexible multiple layer coating configuration.

The present invention will be further understood from the description of specific examples which follow. In the first seven examples, data are obtained for a first graded layer comprising a varying mixture of silicon oxide having a refractive index of about 1.5 and an oxide of zinc and tin having a refractive index of about 2.0, and a second homogeneous layer of silica, having a refractive index of about 1.5, on a substrate of green tinted glass having a refractive index of about 1.5, with the incident medium being air, with a refractive index of 1.0. The last example involves three different silica layer thicknesses over a graded layer of oxides of silicon and tin produced by chemical vapor deposition in a float glass bath. Data are obtained for reflectance at both normal incidence and 65° from normal incidence.

EXAMPLE I

Figure 1B:
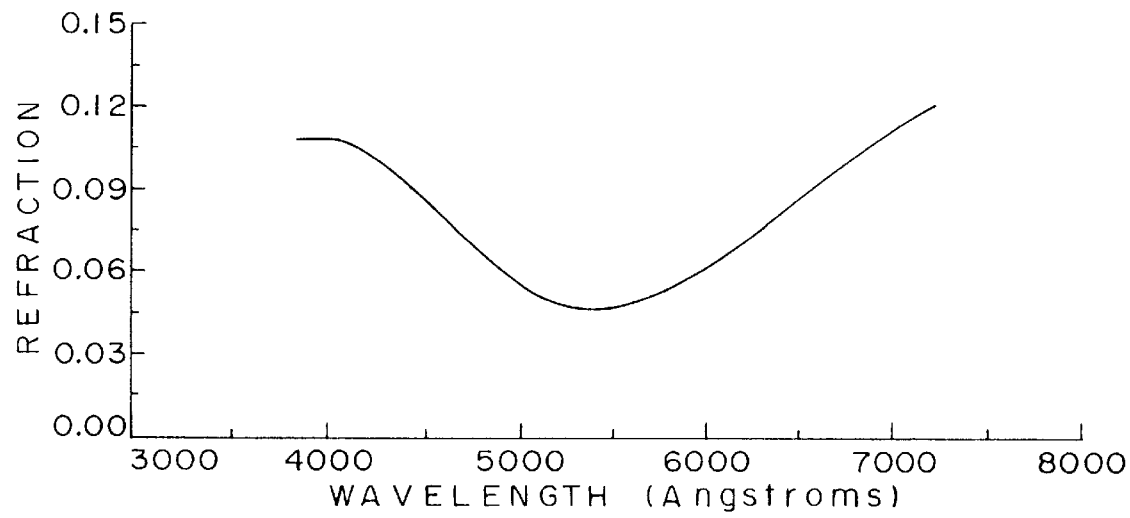
FIG. 1b shows the reflectance as a function of wavelength over the visible spectrum at 65° from normal observation angle where the luminous reflectance Y is 5.5 and the average reflectance is 8 percent.

A ribbon of green tinted glass 3.9 millimeters thick is coated with a first graded layer comprising the oxides of silicon, zinc and tin. The graded layer comprises primarily silicon oxide at the glass-coating interface and changes composition to primarily metal oxides at the opposite coating surface. The thickness of the graded layer is about 1190 Angstroms. Over the graded layer is deposited a homogeneous layer of silica. The thickness of the $SiO_2$ layer is about 1120 Angstroms. The luminous reflectance Y of the coated surface is about 5.5 percent, and the average reflectance from the coated surface over the visible spectrum is about 8 percent. The refractive index gradient is illustrated in FIG. 1a, and the reflectance, optimized for a 65° from normal angle of incidence, is illustrated in FIG. 1b.

EXAMPLE II

Figure 2A:
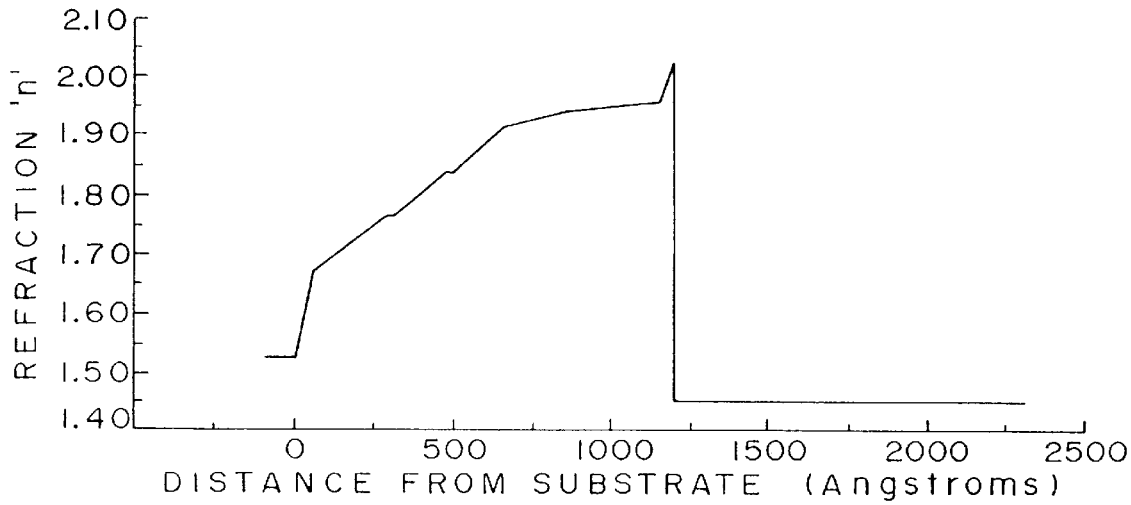
FIG. 2a illustrates the refractive index of a coating with the same graded layer as FIG. 1, but with a silica layer thickness of 886 Angstroms thick for luminous reflectance Y optimization at normal incidence.
Figure 2B:
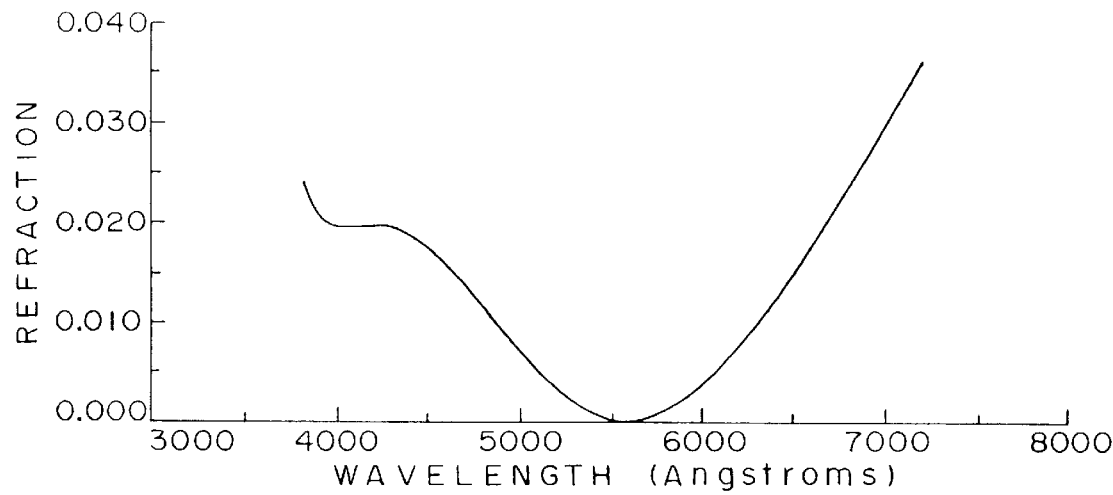
FIG. 2b is the corresponding reflectance curve for the coating, with average reflectance of 1.3 percent and luminous reflectance Y of 0.33 percent.

A ribbon of green tinted glass 3.9 millimeters thick is coated with a first graded layer comprising the oxides of silicon, zinc and tin, with primarily silicon oxides at the glass-coating interface and primarily metal oxides at the opposite coating surface, with a thickness of about 1190 Angstroms. The graded layer is overcoated with silica as in the previous example except that the silica thickness is about 886 Angstroms. The average reflectance from the coated surface is about 1.34 percent, and the luminous reflectance Y is less than 1 percent. The refractive index gradient is illustrated in FIG. 2a, and the reflectance, optimized for normal (90°) angle of incidence, is illustrated in FIG. 2b.

EXAMPLE III

Figure 3A:
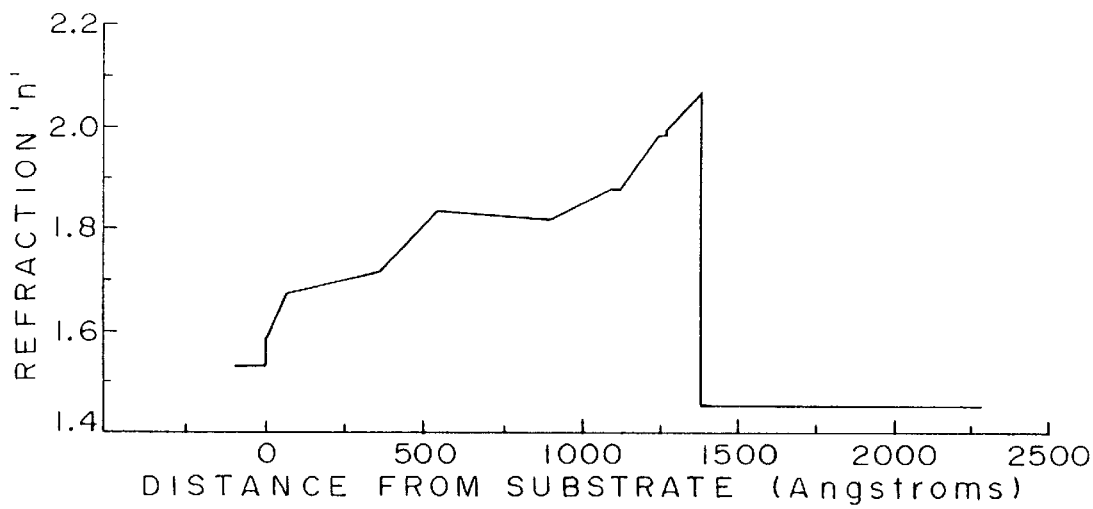
FIG. 3a illustrates the refractive index profile for a coating with the graded layer optimized for average reflectance minimization at normal incidence. The graded layer thickness is 1373 Angstroms and the silica layer thickness is 911 Angstroms.
Figure 3B:
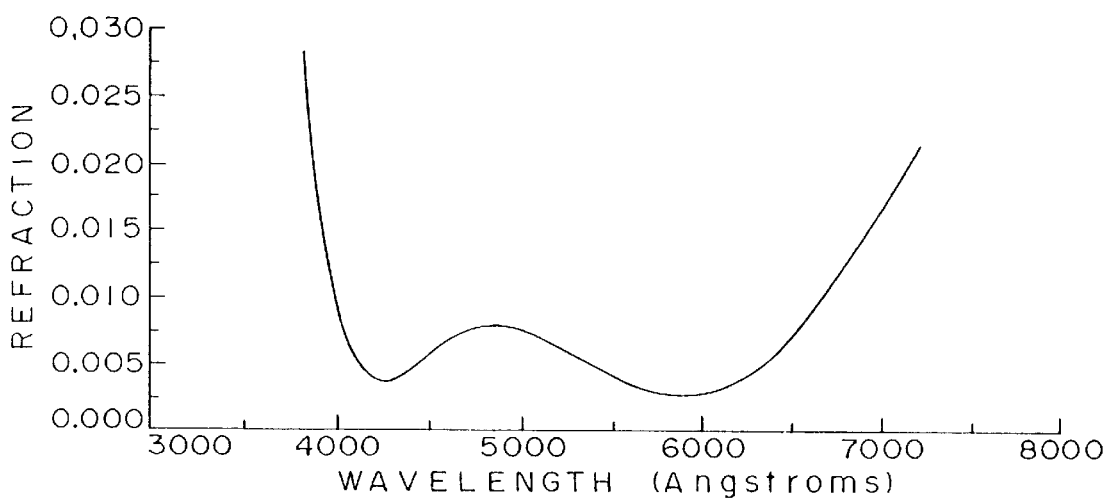
FIG. 3b is the corresponding reflectance as a function of wavelength for the coating, with an average reflectance of 0.8 percent and luminous reflectance Y of 0.44 percent.

A ribbon of green tinted glass 3.9 millimeters thick is coated with a graded layer as in the previous examples, except that the thickness of the graded layer is about 1373 Angstroms The graded layer is overcoated with silica as in the previous examples, except that the thickness of the silica layer is about 911 Angstroms. The luminous reflectance Y from the coated surface is about 0.44 percent, and the average reflectance from the coated surface is about 0.8 percent. The refractive index gradient is shown in FIG. 3a. This coating configuration optimizes, i.e. minimizes, the average reflectance as shown in FIG. 3b.

EXAMPLE IV

Figure 4A:
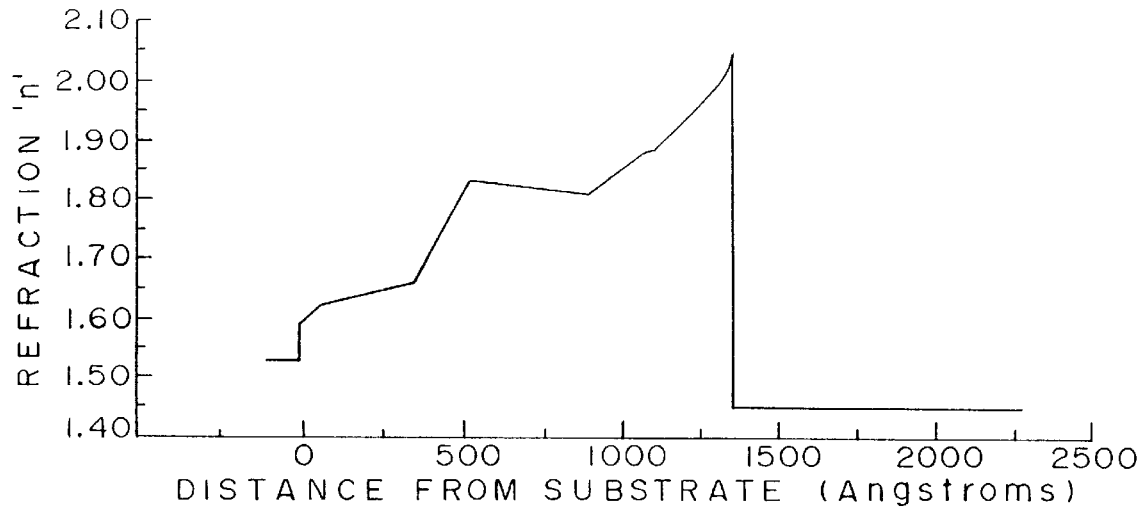
FIG. 4a illustrates a different gradient for luminous reflectance Y minimization, having a graded layer thickness of 1338 Angstroms and silica layer thickness of 934 Angstroms.
Figure 4B:
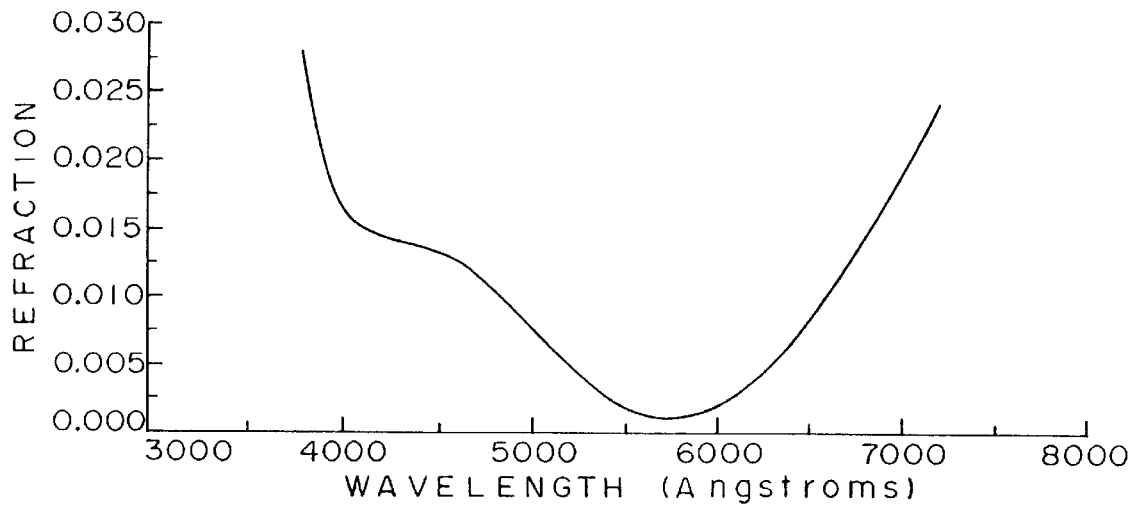
FIG. 4b is the reflectance as a function of wavelength for the coating, having an average reflectance of 1.02 percent and luminous reflectance Y of 0.33 percent.

A ribbon of green tinted glass 3.9 millimeters thick is coated with a graded layer as in the previous examples, except that the thickness of the graded layer is about 1338 Angstroms. The graded layer is overcoated with silica as in the previous examples, except that the thickness of the silica layer is about 934 Angstroms. The average reflectance from the coated surface is about 1 percent, and the luminous reflectance 4 is about 0.33 percent. The refractive index gradient is shown in FIG. 4a. This coating configuration optimizes i.e. minimizes, the luminous reflectance Y at normal incidence as shown in FIG. 4b.

EXAMPLE V

Figure 5A:
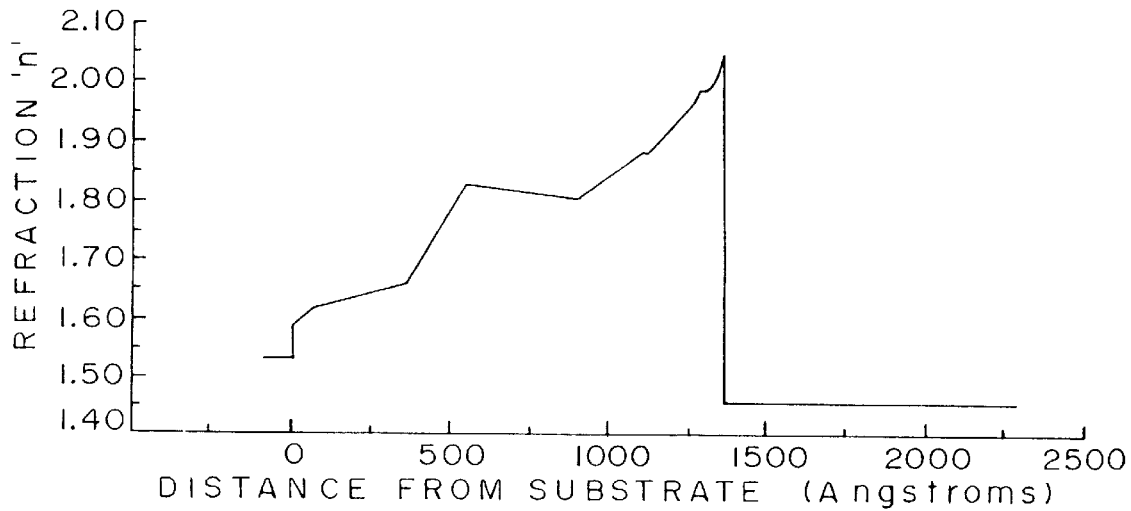
FIG. 5a illustrates the refractive index profile for the same graded layer as in FIG. 4, with a graded layer thickness of 1338 Angstroms, but with a silica layer thickness chosen to minimize the reflectance at 7000 Angstrom wavelength. The silica layer thickness is 1200 Angstroms.
Figure 5B:
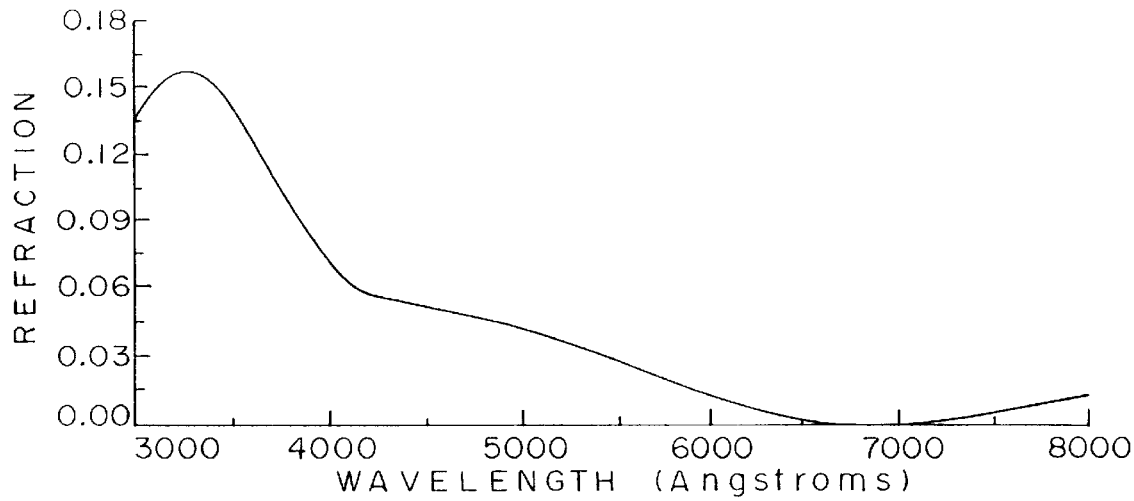
FIG 5b shows the reflectance as a function of wavelength, with zero reflectance at the 7000 Angstrom design wavelength.

A ribbon of green tinted glass 3.9 millimeters thick is coated as in the previous examples with a graded layer having a thickness of 1338 Angstroms. The graded layer is overcoated with silica as in the previous examples, except that the thickness of the silica layer is 1200 Angstroms. The refractive index gradient is shown in FIG. 5a. The coating configuration of this example exhibits essentially zero reflectance at the design wavelength of 7000 Angstroms as can be seen in FIG. 5b.

EXAMPLE VI

Figure 6A:
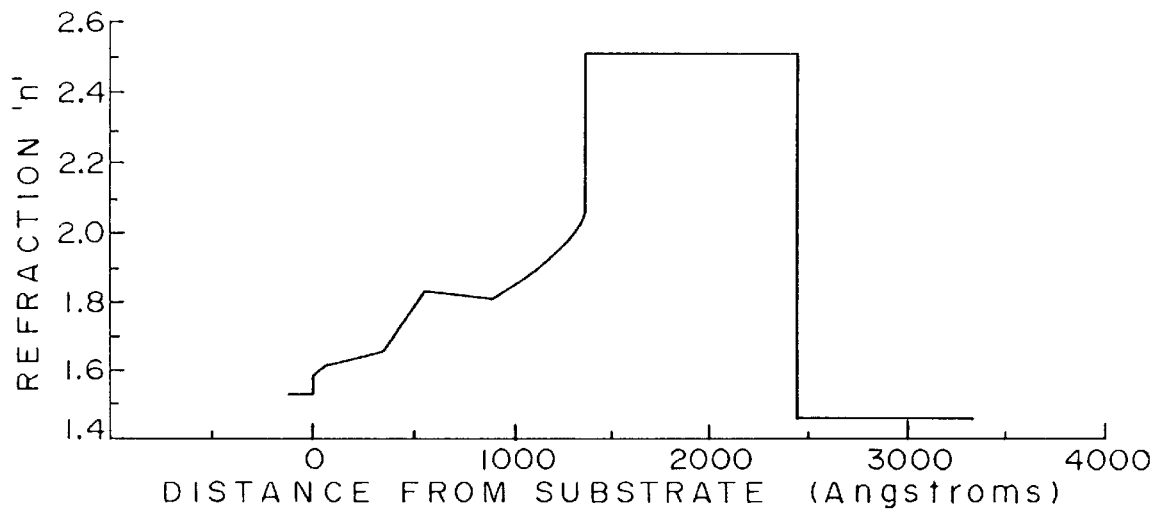
FIG. 6a illustrates the refractive index profile for the same graded layer as shown in FIGS. 4 and 5, but with a half wave thick layer of $TiO_2$ between the graded layer and the silica layer. The result is a broader band reflectance well and lower luminous reflectance Y than for the example in FIG. 4.
Figure 6B:
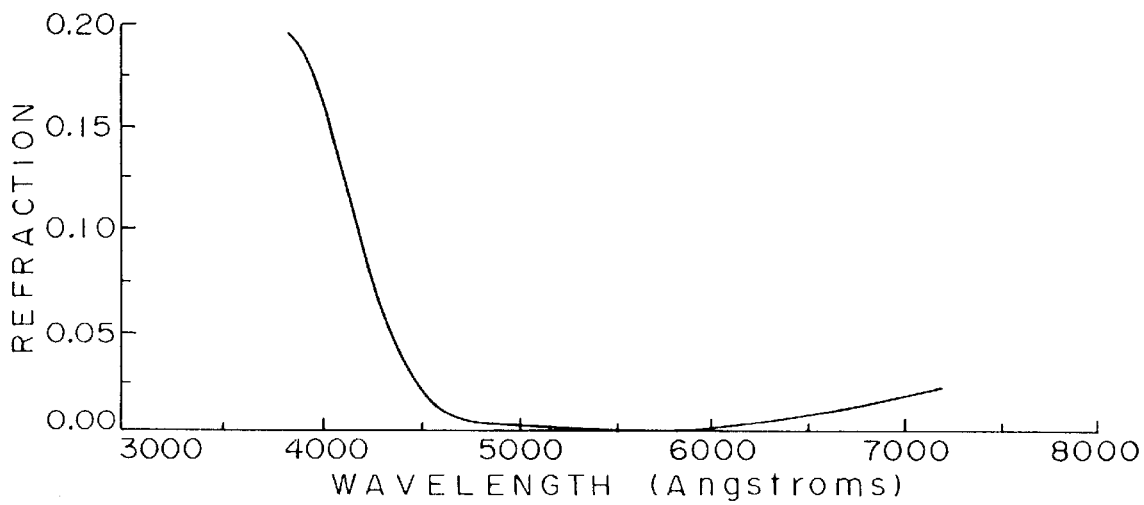
FIG. 6b shows the reflectance as a function of wavelength.

A ribbon of green tinted glass 3.9 millimeters thick is coated as in the previous examples with a graded layer having a thickness of 1338 Angstroms. The graded layer is overcoated with a layer of titanium dioxide 1115 Angstroms thick. A layer of silica 933 Angstroms thick is deposited over the titanium oxide layer. The refractive index gradient is illustrated in FIG. 6a. The coated surface has an average reflectance of 3.2 percent and a luminous reflectance Y of 0.2 10 percent as illustrated in FIG. 6b.

EXAMPLE VII

Figure 7A:
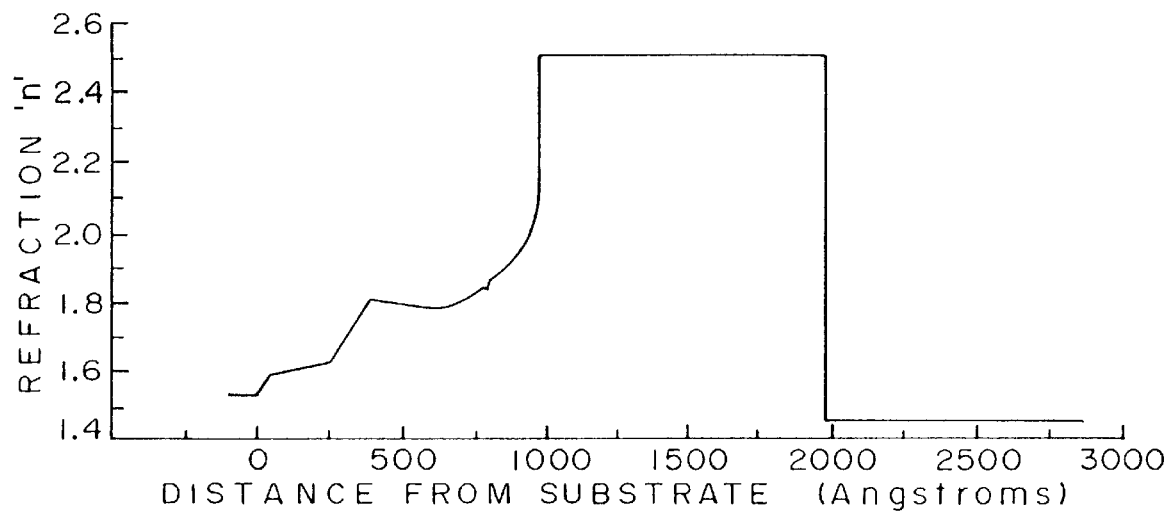
FIG. 7a illustrates the refractive index profile of a coating with a graded layer optimized for use with a half wave thick titanium dioxide layer for minimization of luminous reflectance Y. The graded layer is 960 Angstroms, the half wave layer of titanium dioxide is 1008 Angstroms, and the silica layer is 908 Angstroms.
Figure 7B:
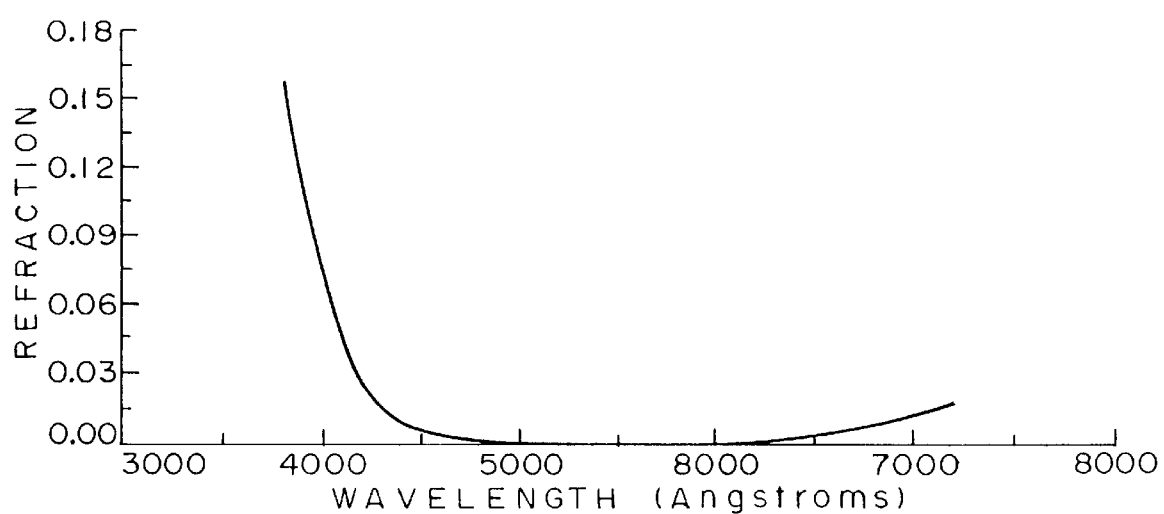
FIG. 7b shows the very low reflectance across the spectrum. Average reflectance is 1.4 percent and luminous reflectance Y is 0.03 percent.

A ribbon of green tinted glass 3.9 millimeters thick is coated as in the previous examples with a graded layer is having a thickness of 960 Angstroms. The graded layer is overcoated with titanium oxide as in the previous examples, but with a thickness of 1008 Angstroms. A final layer of silica is 908 Angstroms thick. The refractive index gradient is shown in FIG. 7a. The coated surface has a very low reflectance across the visible spectrum, with an average reflectance of 1.4 percent and a luminous reflectance of 0.03 percent as shown in FIG. 7b.

EXAMPLE VIII

Figure 8A:
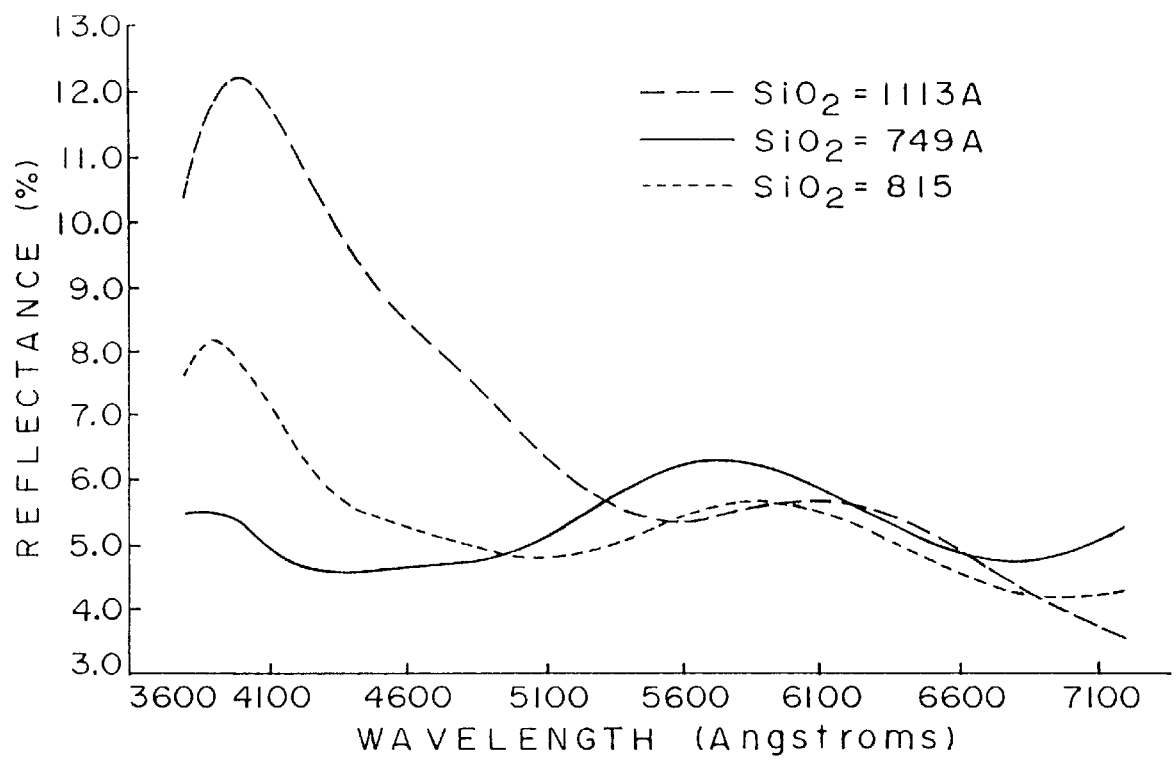
FIG. 8a illustrates the normal reflectance as a function of wavelength for three different thicknesses of silica over a graded layer of mixed oxides of silicon and tin.
Figure 8B:
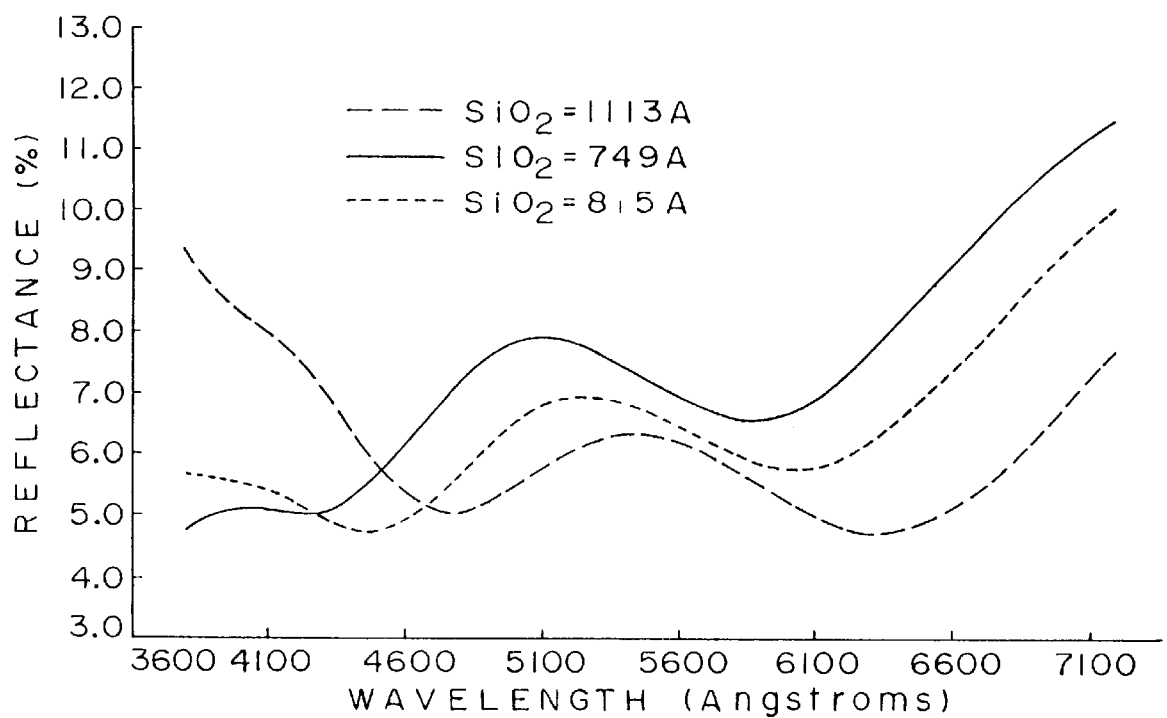
FIG. 8b illustrates the reflectance of the same three silica layer thicknesses over a graded layer of mixed oxides of silicon and tin at a 65° from normal angle of incidence.

A soda-lime-silica float glass ribbon supported by and moving 280 inches (about 7.1 meters) per minute along a molten metal bath comprising primarily tin was coated on its top surface with a graded layer by contacting the surface at a temperature of about 1200° F. (about 650° C.) with a vaporized mixture of varying concentrations of tetraethoxysilane (TEOS) and monobutyltin trichloride (MBTC). A first chemical vapor deposition (CVD) cell was supplied with a coating mixture at concentrations, in mole percent in a 90 SCFM carrier gas stream of 14 percent oxygen in nitrogen, of 0.4 water, 0.2 MBTC, 0.29 TEOS and 0.28 triethylphosphite (TEP, an accelerant). A second cell downstream from the first was supplied with a mixture of 0.58 water, 0.62 MBTC, 0.62 TEOS and 0.1 TEP. The resulting graded layer was coated, outside the float bath, with silica layers at three thicknesses, 749 Angstroms, 815 Angstroms, and 1113 Angstroms. The combined reflectance from both surfaces as a function of wavelength in the visible spectrum at normal incidence for these three configurations is shown in FIG. 8a. The reflectance from the coated surface only at a 65° from normal observation, or installation, angle is illustrated in FIG. 8b.

The above examples illustrate the antireflectance coating of the present invention. Various compositions may be used for the graded layer as well as the homogeneous layer, particularly if substrates or incident media of different refractive index are employed. Any convenient method of coating deposition may be used, especially for the homogeneous layer, where sputtering may be preferred. The scope of the present invention is defined by the following claims.

What is claimed is:

1. A method for applying a low reflective coating comprising the steps of:

moving a glass ribbon on a molten pool of metal, wherein surface of the ribbon on the molten pool of metal is defined as supported surface and surface of the ribbon opposite to the supported surface is defined as unsupported surface, the ribbon having a refractive index, and a visible reflectance of a predetermined value;

depositing a first film comprising a mixture of oxides over at least a portion of the unsupported surface;

the first film at interface of the first film and the unsupported surface defined as the first surface of the first film, the first surface of the first film having a refractive index approximately equal to the refractive index of the float ribbon and the refractive index of the first film has a generally increasing value of refractive index as distance from the unsupported surface of the ribbon increases;

depositing a second film over the first film, the second film having a substantially uniform refractive index throughout its thickness, with the refractive index of the second film substantially equal to the square root of the product of the refractive index of the first film at the first surface of the first film and refractive index of medium in contact with the surface of the second film farthest from the unsupported surface of the ribbon, and an optical thickness approximately equal to one quarter of a selected design wavelength, and removing the float ribbon from the pool of molten metal.

2. The method as set forth in claim 1, wherein the step of depositing the first film includes the step of depositing a first film of a mixture of aluminum and tin oxide.

3. The method as set forth in claim 1, wherein the step of depositing the second film includes the step of depositing a second film of silica.

4. The method as set forth in claim 1, wherein the second film has a refractive index in the range of about 1.4 to 1.65 at interface of the first film.

5. The method as set forth in claim 1, wherein the first film has a refractive index in the range of about 1.7 to 2.8 at the first surface of the first film.

6. The method as set forth in claim 1, wherein the second film has a refractive index in the range of about 1.4 to 1.5.

7. The method as set forth in claim 1, wherein the average reflectance in the visible spectrum from the float ribbon is in the range of 0.01 to 1.5 percent.

8. method as set forth in claim 1, wherein the luminous reflectance Y of the coated ribbon is in the range of about 0.01 to 1.5 percent.

9. The method as set forth in claim 1, wherein the thickness of the first film is in the range of about 500 to 3000 Angstroms.

10. The method as set forth in claim 1, wherein the thickness of the second film is in the range of about 400 to 2000 Angstroms.

11. The method as set forth in claim 1, wherein the second film has an optical thickness approximately equal to one quarter of a selected design wavelength and further comprising the step of interposing a third film between the first and second films, the third film having an optical thickness of about one-half the selected design wavelength.

12. The method as set forth in claim 11, wherein the thickness of the first film is at least a quarter wave optical thickness.

13. The method as set forth in claim 11, wherein one surface of the third film contacts the second film and other surface of the third film contacts the first film.

14. The method as set forth in claim 11, wherein the third film is a titanium dioxide film.

15. The method as set forth in claim 11, further wherein the third film has a refractive index in the range of about 1.7 to about 3.0.

16. The method as set forth in claim 11, wherein the average reflectance in the visible spectrum from the coated ribbon is in the range of 0.01 to 1.5 percent.

17. The method as set forth in claim 11, wherein the luminous reflectance Y of the coated ribbon is in the range of about 0.01 to 1.5 percent.

* * * * *